(12) United States Patent
Hilger et al.

(10) Patent No.: US 7,788,991 B2
(45) Date of Patent: Sep. 7, 2010

(54) BRAKE SYSTEM DEVELOPMENT TOOL HAVING A MECHANISM FOR SETTING DIFFERENT PEDAL RATIOS

(75) Inventors: Joseph H. Hilger, Fort Wayne, IN (US); William D. Mann, Roanoke, IN (US); Christopher F. Wright, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 12/055,382

(22) Filed: Mar. 26, 2008

(65) Prior Publication Data
US 2009/0241724 A1 Oct. 1, 2009

(51) Int. Cl.
*G05G 1/40* (2008.04)
(52) U.S. Cl. .............................. 74/512; 74/513; 74/560
(58) Field of Classification Search ........... 74/512–514, 74/518, 560, 562, 478, 516
See application file for complete search history.

(56) References Cited

U.S. PATENT DOCUMENTS

| 2,184,294 | A | * | 12/1939 | Fergueson ................. 74/518 |
| 4,610,588 | A | * | 9/1986 | Van Buren et al. .......... 411/173 |
| 4,875,385 | A |   | 10/1989 | Sitrin |
| 4,889,006 | A | * | 12/1989 | Kolinske et al. ........... 74/502.4 |
| 5,351,573 | A | * | 10/1994 | Cicotte ........................ 74/512 |
| 5,460,061 | A | * | 10/1995 | Redding et al. .............. 74/512 |
| 5,996,438 | A |   | 12/1999 | Elton |
| 5,996,440 | A | * | 12/1999 | Nawata et al. ................ 74/512 |
| 6,151,985 | A | * | 11/2000 | Garber et al. ................. 74/512 |
| 6,151,986 | A |   | 11/2000 | Willemsen |
| 6,289,761 | B1 | * | 9/2001 | Reynolds et al. .............. 74/512 |
| 6,301,993 | B1 |   | 10/2001 | Orr |
| 6,324,939 | B1 |   | 12/2001 | Cicotte |
| 6,367,348 | B1 | * | 4/2002 | Toelke et al. ................. 74/512 |
| 6,367,349 | B1 |   | 4/2002 | Allen |
| 6,453,767 | B1 |   | 9/2002 | Willemsen |
| 6,516,683 | B2 | * | 2/2003 | Sundaresan et al. ........... 74/560 |
| 6,609,438 | B1 | * | 8/2003 | Bigham et al. ................ 74/560 |
| 6,782,776 | B2 | * | 8/2004 | Oberheide et al. ............ 74/512 |
| 6,918,316 | B2 |   | 7/2005 | Johansson |
| 6,952,980 | B2 | * | 10/2005 | Hayashihara et al. ......... 74/512 |
| 2002/0078784 | A1 | * | 6/2002 | Hayashihara ................ 74/512 |
| 2002/0148322 | A1 | * | 10/2002 | Gmurowski et al. .......... 74/512 |

* cited by examiner

*Primary Examiner*—Richard W Ridley
*Assistant Examiner*—Thomas Diaz
(74) *Attorney, Agent, or Firm*—Jeffrey P. Calfa; Mark C. Bach

(57) ABSTRACT

A brake system development tool (10) providing adjustment of pedal ratio in a brake pedal mechanism without having to disassemble the mechanism and replace parts. A positioning mechanism carried by the pedal arm (20) positions the pedal arm and the brake pedal pivot shaft (16) relative to the pushrod shaft (18) to set the distance between the axis of the brake pedal pivot shaft and the axis of the pushrod shaft.

12 Claims, 5 Drawing Sheets

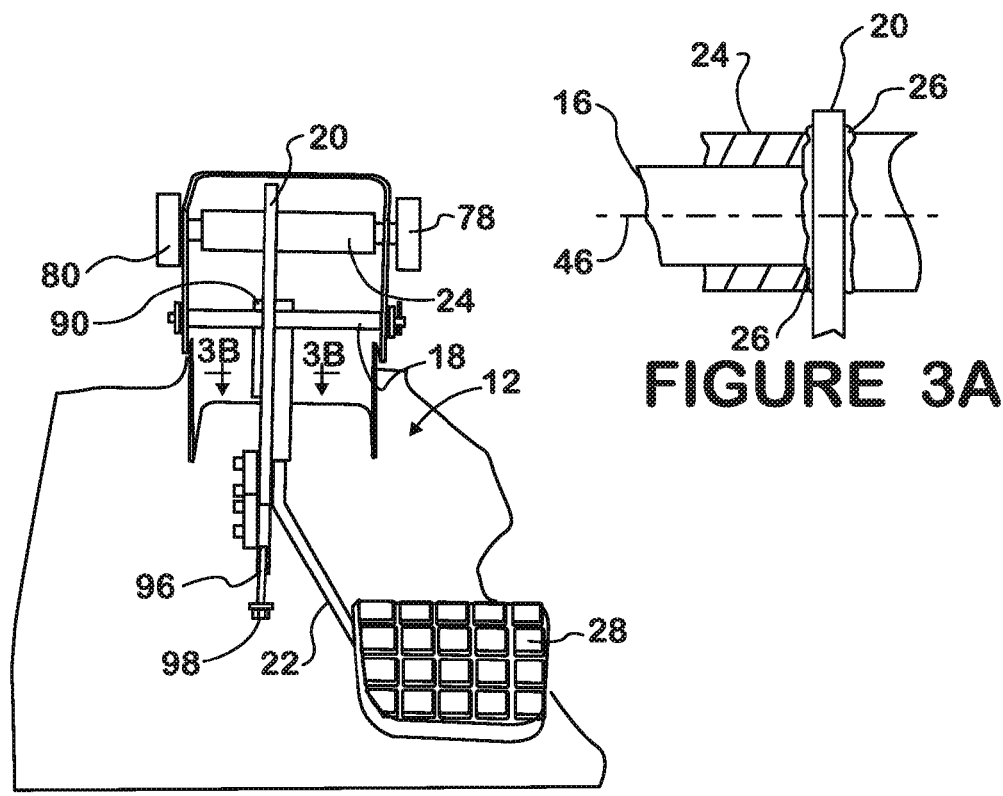
FIGURE 3
FIGURE 3A
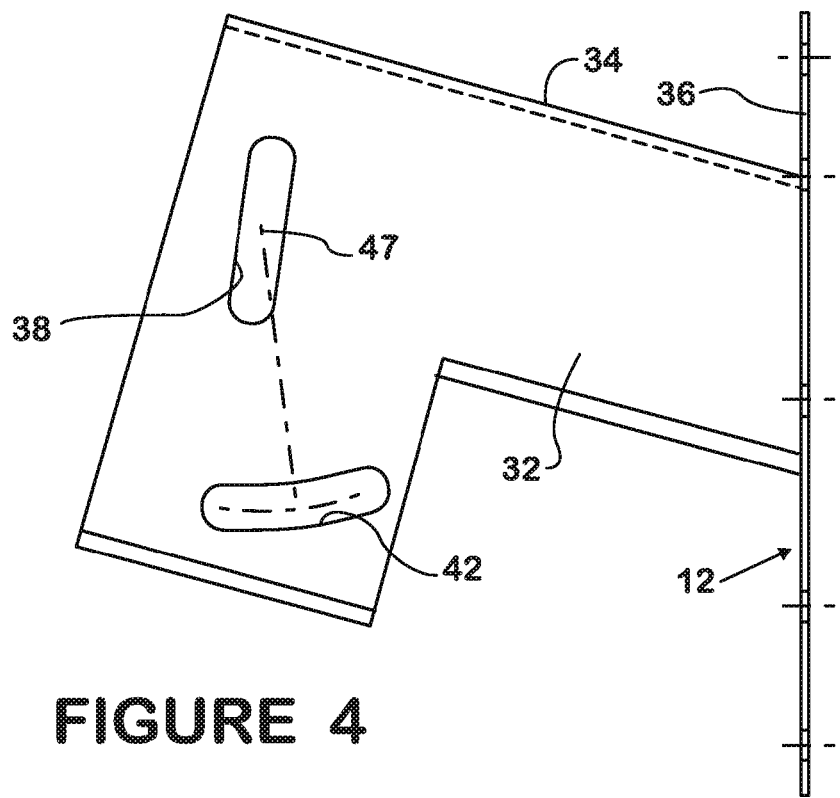
FIGURE 4

BRAKE SYSTEM DEVELOPMENT TOOL HAVING A MECHANISM FOR SETTING DIFFERENT PEDAL RATIOS

FIELD OF THE INVENTION

This invention relates generally to foot-pedal-operated mechanisms such as brake pedal mechanisms for operating the service brake in a motor vehicle, and more particularly to a brake pedal mechanism that is primarily intended for use as a brake system development tool for establishing optimal brake pedal feel.

BACKGROUND OF THE INVENTION

The service brake of a motor vehicle is typically actuated when a driver of the vehicle uses his/her foot to depress a brake pedal. In a hydraulic brake system, depression of the pedal acts through a pushrod connected to a master cylinder to cause hydraulic brake fluid that is trapped in brake lines between the master cylinder and hydraulic actuators at the wheels to be displaced in a manner that moves either a shoe in the case of a shoe brake or calipers in the case of a disc brake to frictionally engage either a drum or a rotor that turns with the wheel. In an air brake system, the pedal still acts through a pushrod, but on an air brake valve instead of on a master cylinder.

In some production vehicles, the brake pedal is suspended from a brake pedal mounting bracket for swinging motion about a pivot axis. In a representative vehicle, a brake pedal tube, to which one end of a brake pedal arm is joined, is disposed to turn on a horizontal pedal mounting shaft that is supported on vertical side walls of the bracket and that defines the pivot axis of the brake pedal. A pushrod is connected by a suitable connection, such as a clevis, to the pedal arm at some distance below the pivot axis. A pedal pad that is pushed by a person's foot to apply the service brake is at an end of the pedal arm below the point of connection of the pushrod to the pedal arm.

From its connection to the pedal arm, the pushrod extends in a sealed manner through a hole in a front wall of the bracket and an aligned hole in the vehicle dash panel to a master cylinder in the case of a hydraulic brake system or to an air brake valve in the case of an air brake system. A return spring acts on the pedal arm to return it to its initial position when a person's foot that had been depressing the pedal pad is removed from the pedal pad.

The geometry of this representative arrangement provides a mechanical advantage based on the ratio of the distance of the pedal pad from the pivot axis to the distance of the connection of the pushrod to the pedal arm from the pivot axis. The mechanical advantage, or pedal ratio, is one factor in the feel that the brake system presents to a driver's foot pressing on the pedal pad to apply the service brake.

Establishing an acceptable feel for the pedal is part of the brake system development process. In conjunction with inputs from any of various sources, such as product planners, user surveys, competitive product evaluations, etc., brake system designers and engineers are tasked with creating a system having pedal feel that is considered acceptable to as large a population of drivers as reasonably practical.

If a system is designed and engineered with the expectation that it will provide an acceptable pedal feel to most drivers, but when constructed and tested during the prototype phase is found not to do so, a typical practice has been to design and fabricate new parts that will provide a different pedal ratio hopefully providing the desired result.

The new parts require time to fabricate. An existing prototype brake system must be disassembled to remove parts that are to be replaced before the new parts can be installed. This process may have to be repeated multiple times. Consequently, valuable time may be lost in the development process, and added development costs may be incurred.

SUMMARY OF THE INVENTION

The invention that is the subject of the present patent application relates to a brake system development tool that has a brake pedal mechanism possessing unique constructional features that allow the brake pedal ratio to be conveniently and quickly changed during the course of brake system development without having to disassemble the mechanism. In this way, significant amounts of time and money can be saved.

While possessing the ability to adjust the brake pedal ratio, the inventive mechanism does so in conjunction with relative adjustment of the pedal pad on the pedal arm such that the pedal pad remains substantially at the same elevation above the floor of the vehicle. The distance of the pedal pad from the floor is chosen not so much by characteristics of a particular service brake system, but rather is established to satisfy as large a population of driver foot sizes as reasonably practical.

The inventive mechanism also allows adjustment in rather fine, and easily measurable, increments.

The disclosed embodiment of the invention has a brake pedal mounting bracket with two sides, each of which contains two slots, one for the pedal pivot shaft, the other for guiding travel of a shaft to which the push rod connects when the pedal is operated to apply the service brake. This latter shaft will hereafter be referred to as the pushrod shaft.

The pair of pedal pivot shaft slots are identical and in lateral alignment with each other across the open space between the bracket sides. They are also straight and substantially vertical.

The other slots form a second pair of slots for guided constraint of pushrod shaft travel. They too are identical and in lateral alignment with each other across the open space between the bracket sides. However, their lengths run along arcs that are circular to the pedal pivot axis at a location of the latter that is midway between limits to which it may be set by positioning the pedal mounting shaft within the generally vertical pair of slots. The widths of the arcs of the second pair of slots are sufficiently greater than the diameter of the pushrod shaft running through them to allow that shaft to freely travel within them at any of the possible positions that the pedal mounting shaft can assume within the vertical pair of slots.

The brake pedal ratio of the mechanism is adjusted by moving the pedal mounting shaft within the vertical slots while the pushrod shaft remains constrained by passage through the arcuate slots. The pedal mounting shaft has threaded ends disposed outboard of the bracket side walls. Knurled knobs are threaded onto the ends of the pedal mounting shaft. When loosened, the knobs allow the pedal mounting shaft to move within the vertical slots, and when tightened against the sides of the bracket, they hold the pedal mounting shaft fast in place on the bracket.

For positioning the pedal mounting shaft along the vertical slots, the disclosed embodiment of mechanism has a threaded rod that is threaded in a through-hole in the pushrod shaft located centrally between the bracket sides. Because its end segments pass through the arcuate slots in the brackets and rest on the lower edges of the slots, the pushrod shaft is constrained against falling down, and because of its threading to the pushrod shaft, the threaded rod is also constrained against falling down.

The pedal arm is constructed to have a through-slot whose length is radial to the pivot axis. The pushrod shaft extends through that through-slot such that its centrally threaded hole is located in the through-slot, and because the threaded rod is threaded into the pushrod shaft, the threaded rod consequently runs lengthwise in the through-slot.

At a location below the pushrod shaft, the threaded rod has an operative association with the pedal arm that unites the two for travel radial to the pivot axis without preventing the rod from turning about its own axis. A proximal end of the threaded rod contains a tool surface, such as a hex head, that can be engaged by a tool to turn the threaded rod. Because the pushrod shaft is constrained by the bracket and because the pedal arm and the threaded rod are coupled to move in unison as explained above, the turning of the threaded rod in one sense, with the pedal mounting shaft knobs loosened, causes the threaded rod to advance vertically upward relative to the pushrod shaft and the bracket. The upward advance of the threaded rod carries the pedal arm, including the pedal tube, upward with it. The pedal mounting shaft moves upward as well because it passes through the pedal tube.

As the threaded rod is advancing upward relative to the pushrod shaft, its threaded engagement with the pedal arm extension is causing the latter to move downward on the upward moving pedal arm with the net result that the pedal pad remains substantially at the same elevation off the floor.

Once a desired position for the pivot axis has been attained, the knobs on the ends of the pedal mounting shaft are tightened against the side wall of the bracket.

If the threaded rod is being turned in the opposite sense with the knobs loosened, it moves downward on the pushrod shaft, carrying the pedal arm and pedal mounting shaft with it. At the same time, the threaded engagement of the threaded rod with the pedal arm extension is causing the latter to move upward on the downward moving pedal arm with the net result that the pedal pad remains substantially at the same elevation off the floor.

One generic aspect of the present invention relates to a foot pedal mechanism comprising: a bracket, a first shaft supported on the bracket, a pedal arm supported on the first shaft for swinging about an axis of the first shaft, and a second shaft.

The second shaft has an axis parallel to the axis of the first shaft. The second shaft is also operatively related to the pedal arm for swinging with the pedal arm by a connection with a positioning mechanism carried by the pedal arm for positioning the pedal arm and the first shaft relative to the second shaft to set the distance between the axis of the first shaft and the axis of the second shaft. The second shaft is also constrained to follow a track described by an arc about the axis of the first shaft when swinging with the pedal arm.

The foregoing, along with further features and advantages of the invention, will be seen in the following disclosure of a presently preferred embodiment of the invention depicting the best mode contemplated at this time for carrying out the invention. This specification includes drawings, now briefly described as follows.

BRIEF DESCRIPTION OF THE DRAWINGS

FIG. 3 is a view of the tool on a smaller scale looking upward from the floor.

FIG. 3A is an enlarged fragmentary view of a portion of FIG. 3, partly in section.

FIG. 3B is an enlarged cross section view in the direction of arrows 3B-3B in FIG. 3.

FIG. 4 is a right side view of a brake pedal mounting bracket.

DESCRIPTION OF THE PREFERRED EMBODIMENT

Figure 1:
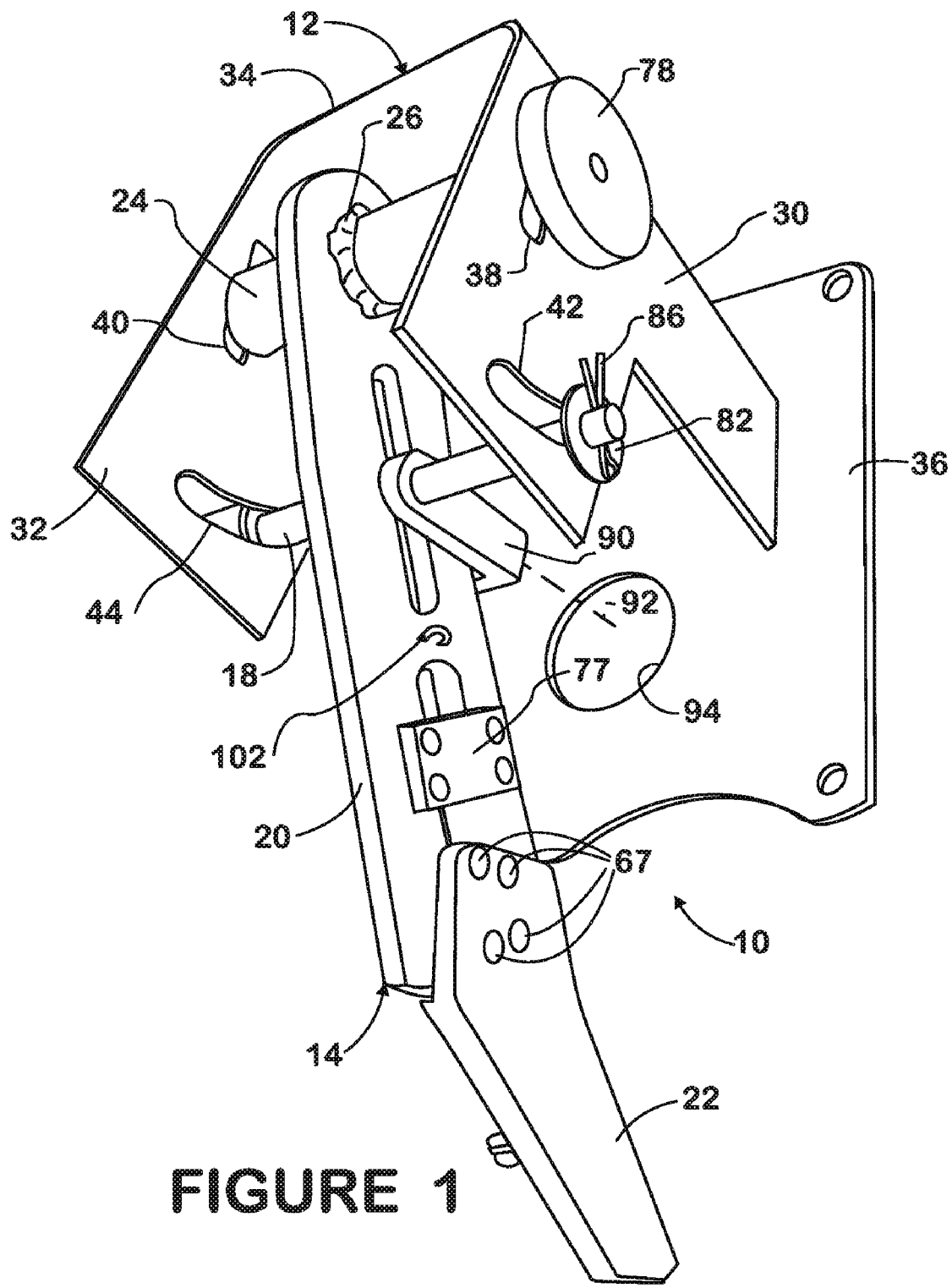
FIG. 1 is a perspective view of a brake pedal development tool embodying principles of the invention.
Figure 2:
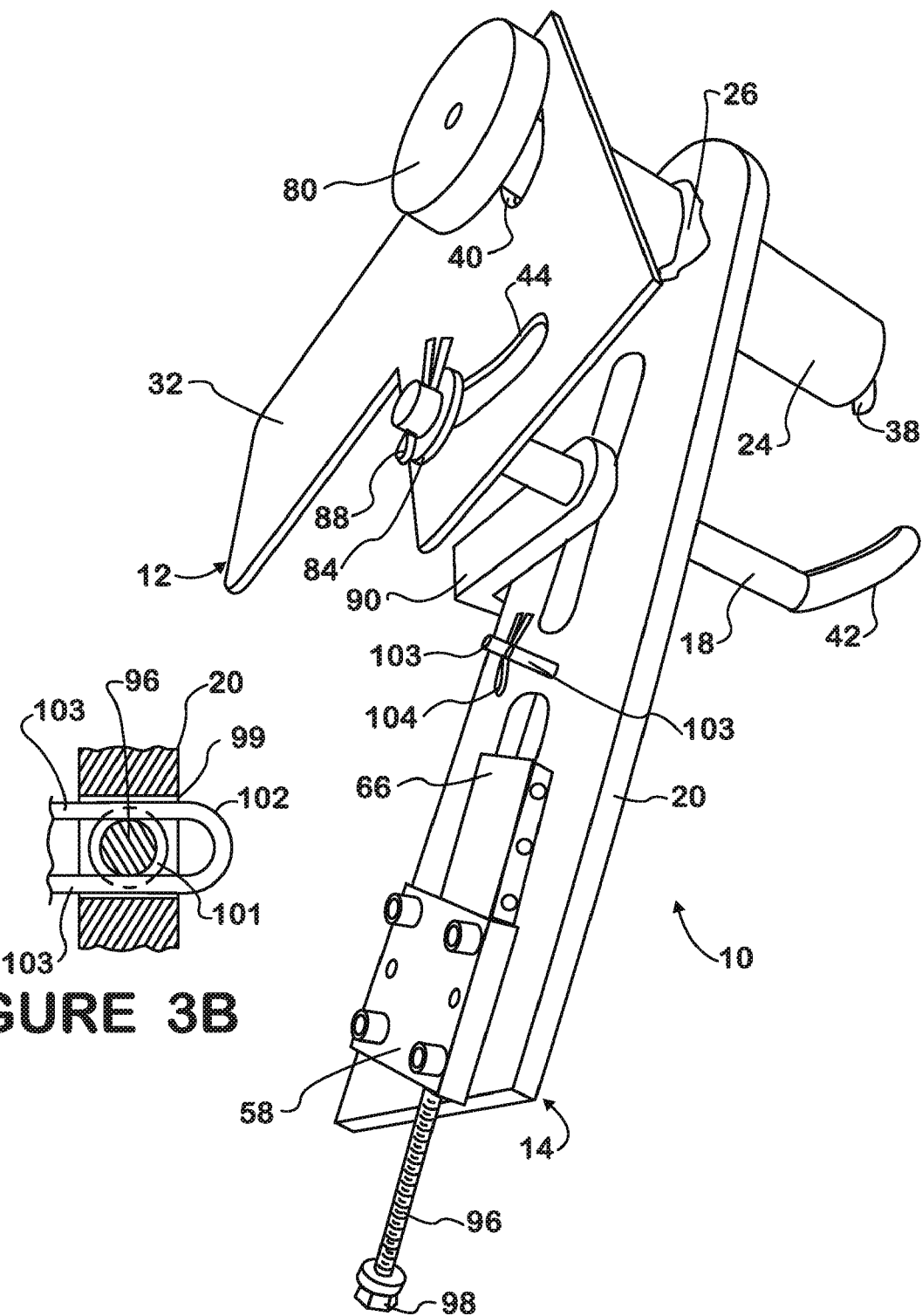
FIG. 2 is a perspective view of the tool from a different direction.

FIGS. 1, 2, 3, 3A, and 3B illustrate a brake pedal development tool 10 that in accordance with principles of the invention comprises a brake pedal mounting bracket 12, a brake pedal assembly 14, a pedal mounting shaft 16, and a pushrod shaft 18.

Brake pedal assembly 14 comprises a pedal arm 20, a pedal extension 22, and a pedal tube 24.

Midway along its length, pedal tube 24 passes through a circular hole in one end of pedal arm 20 where the two parts are joined, such as by weldments 26. Pedal mounting shaft 16 passes through tube 24, and end segments of shaft 16 are supported on bracket 12, thereby mounting pedal assembly 14 on bracket 12 for swinging motion on shaft 16.

Pedal extension 22 is disposed at an opposite end of pedal arm 20 where it is arranged for sliding travel lengthwise of the pedal arm, as will be more fully explained later. Beyond pedal arm 20, pedal extension 22 has a pedal pad 28 intended to be depressed by a person's foot.

Bracket 12, which is shown by itself in FIG. 4, comprises two sides 30, 32 that are joined by a top 34. A dash panel mounting plate 36 is welded to front edges of the sides and top.

Each side 30, 32 contains two slots, one for pedal pivot shaft 16, the other for guiding travel of pushrod shaft 18. The pair of pedal pivot shaft slots 38, 40 are identical and in lateral alignment with each other across the open space between bracket sides 30 and 32. They are also straight and substantially vertical.

The other slots 42, 44 form a second pair of slots for guided constraint of the travel of pushrod shaft 18. Slots 42, 44 are identical and in lateral alignment with each other across the open space between bracket sides 30 and 32. However, the lengths of slots 42, 44 run along arcs that are circular to the pedal pivot axis (the axis 46 of shaft 16) at a location of the latter that is midway (reference numeral 47 in FIG. 4) between limits to which it may be set by positioning the pedal mounting shaft within the generally vertical pair of slots 38, 40, as will be more fully explained hereinafter. The widths of slots 42, 44 are sufficiently greater than the diameter of pushrod shaft 18 passing through them to allow the pushrod shaft to freely travel within them at any of the possible positions that pedal mounting shaft 16 can assume within slots 38, 40.

Figures 5, 6:
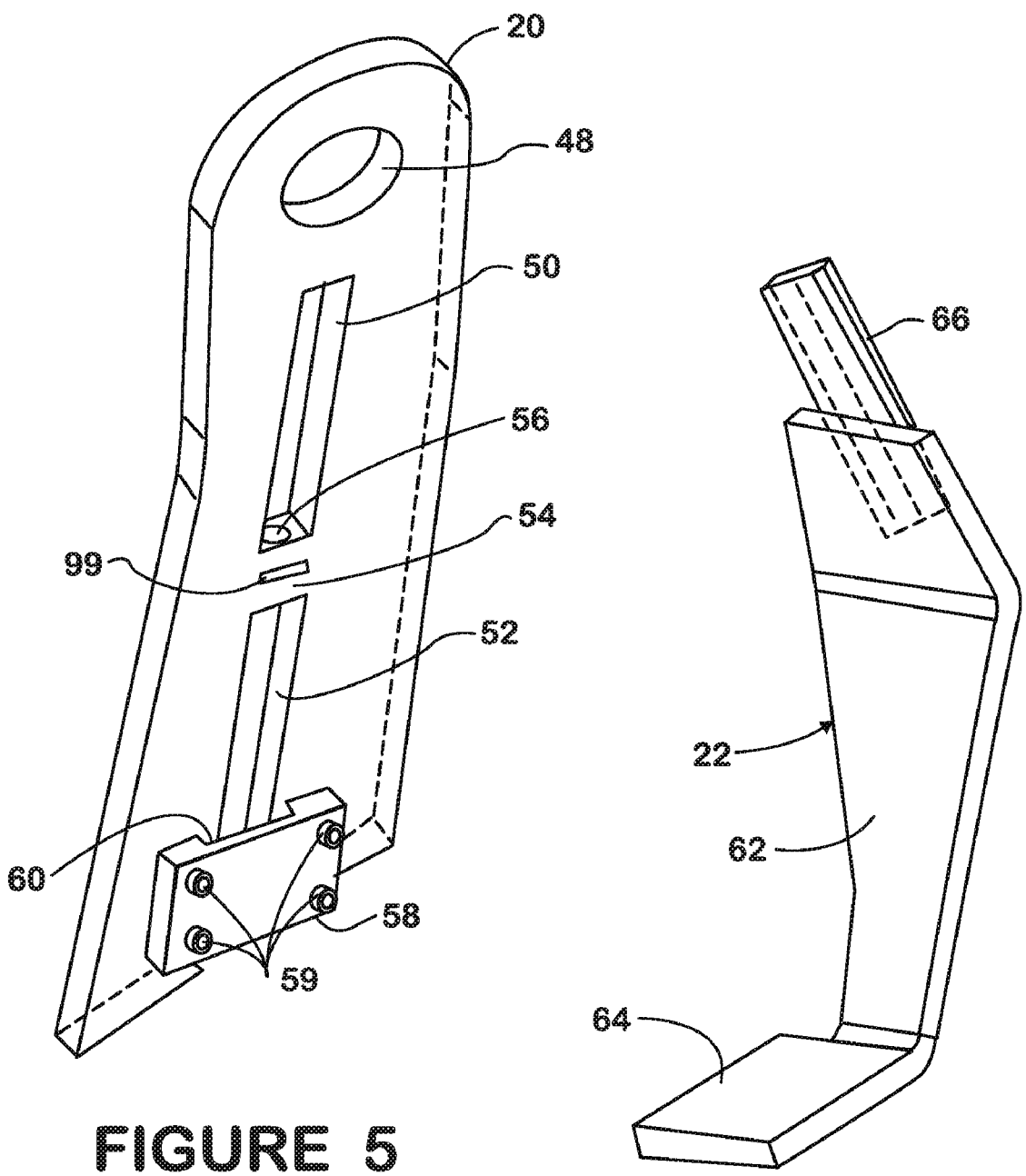
FIG. 5 is a perspective view of a brake pedal arm.
FIG. 6 is a perspective view of a brake pedal extension.

Further detail of pedal arm 20 appears in FIG. 5 showing the circular hole 48 through which tube 24 passes and also a rectangular through-slot 50 whose length is radial to axis 46 with shaft 16 passing through tube 24. Pedal arm 20 further comprises a second rectangular through-slot 52 beyond the first with its length on the same radial as that of the first. The two through-slots 50, 52 are separated by a bridge 54 that contains a circular hole 56 that is open to both through-slots and whose center is on the same radial.

Bridge 54 forms an outer lengthwise end of through-slot 50 and an inner lengthwise end of through-slot 52. Because it stops short of hole 48, the inner lengthwise end of through-slot 50 is closed, while the outer lengthwise end of through-slot 52 is open.

A generally rectangular-shaped bridge plate 58 is fastened to one side of pedal arm 20 by fasteners 59 to cover the side of through-slot 52 along a portion of its length adjacent its open end. A face of bridge plate 58 that is toward the side of pedal arm 20 contains a rectangular-shaped channel 60 that is wide enough to span more than the width of through-slot 52.

Figure 7:
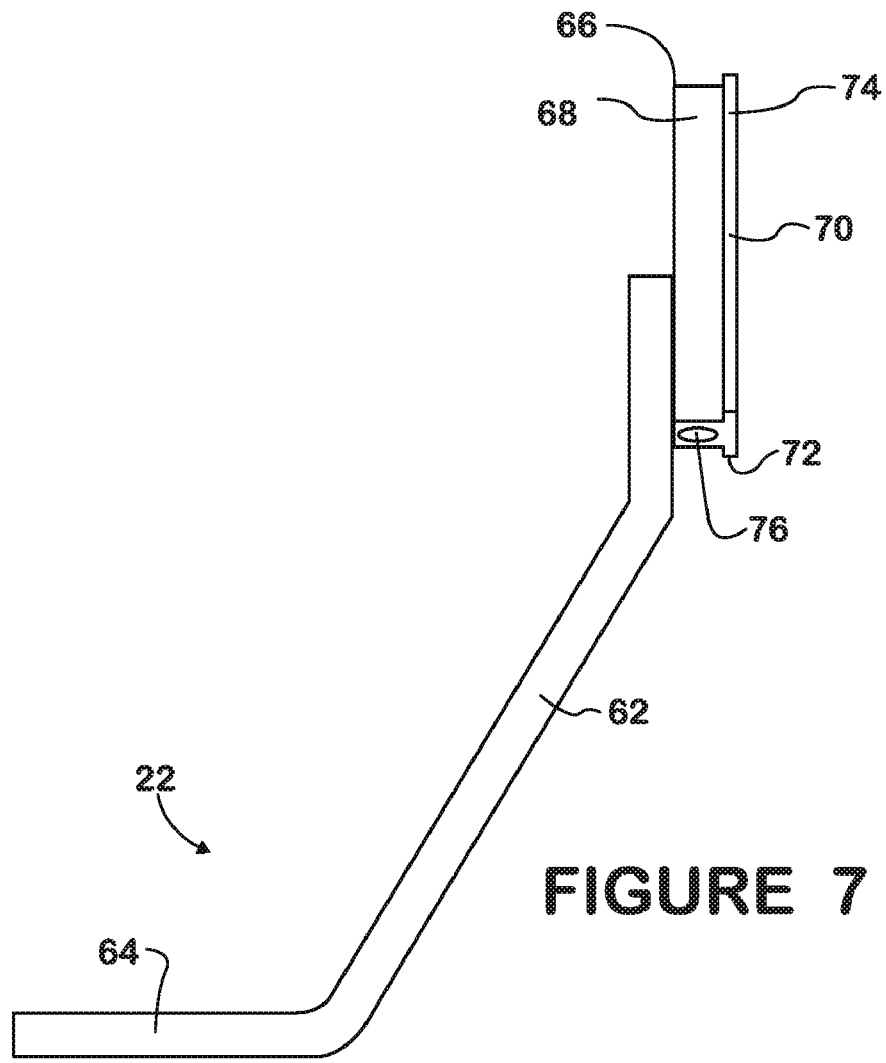
FIG. 7 is a view of the brake pedal extension in the direction of arrows 7-7 in FIG. 6.
Figure 8:
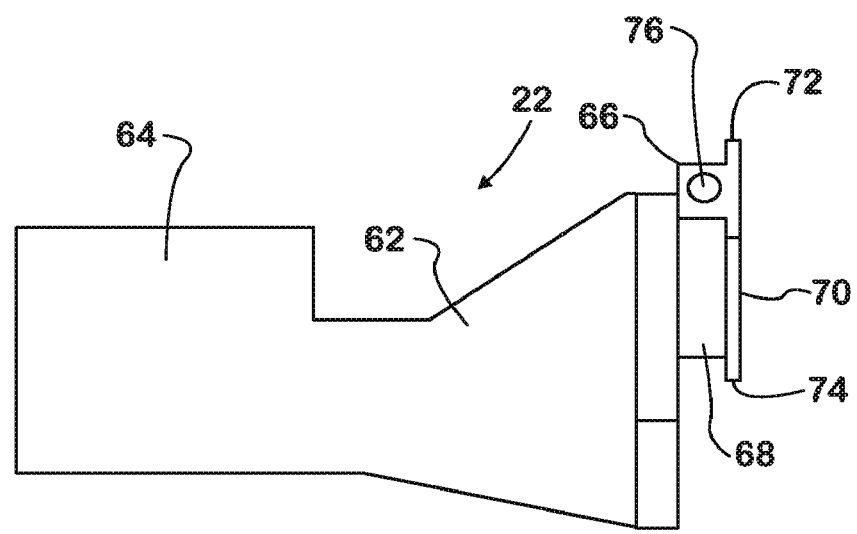
FIG. 8 is a top view of FIG. 7.

FIGS. 6, 7, and 8 show pedal extension 22 to comprise an extension arm 62 that has an outturned flange 64 at one end providing the base of pedal pad 28 to which a rubber pedal pad (omitted from FIGS. 6, 7, and 8) is assembled. Pedal extension 22 contains a slide 66 at the opposite end of extension arm 62.

Slide 66 is a separate part against which a side face of extension arm 62 is disposed for attachment by fasteners 67. Slide 66 enables pedal extension 22 to be slid onto pedal arm 20 via the open end of through-slot 52. Slide 66 has a body 68 of rectangular cross section dimensioned for a close sliding fit lengthwise along through-slot 52. Along one side of body 68, slide 66 has a relatively thin rectangular face wall 70 having margins 72, 74 that make it wider than body 68. When slide 66 is slid into through-slot 52, wall 70 has a close sliding fit in channel 60. Because margins 72, 74 overlap the widthwise margins of through-slot 52, slide 66 is captured in the through-slot with only lengthwise sliding along the through-slot allowed. A threaded-through-hole 76 runs the full length of body 68, and is clear of fasteners 67. A four-sided flat plate 77 is disposed against and fastened to the side of pedal arm 20 opposite bridge 58 to aid in keeping through-slot 52 from spreading due to force applied to the pedal pad.

Fasteners, such as knurled knobs 78, 80, are threaded onto end segments of pedal mounting shaft 16 outboard of bracket sides 32, 34 respectively. When loosened, knobs 78, 80 allow the end segments, and hence shaft 16, to travel along slots 38, 40. When tightened, knobs 78, 80 hold the end segments, and hence the shaft, fast against the bracket sides.

Ends segments of pushrod shaft 18 extend through slots 42, 44. Washers 82, 84 are disposed on the end segments outboard of sides 32, 34 to overlap the margins of slots 42, 44. Cotters 86, 88 in holes through the diameter of shaft 18 outboard of the washers retain the washers and keep the shaft in the slots.

A clevis 90 at one end of a pushrod 92 is fit to pushrod shaft 18. The pushrod, shown only schematically in FIGS. 1 and 2, extends in a sealed manner through a hole 94 in dash panel mounting plate 36 and an aligned hole in the vehicle dash panel to a master cylinder in the case of a hydraulic brake system or to an air brake valve in the case of an air brake system. A return spring (not shown) acts on the pedal arm to return the pedal arm assembly to its initial position when a person's foot that had been depressing the pedal pad is removed from the pedal pad.

A positioning mechanism for selectively setting the brake pedal ratio of development tool 10 comprises a rod 96 whose length runs radial to axis 46 and that has operative association with pedal arm 20, pushrod shaft 18, and pedal extension 22. Rod 96 has a proximal end containing a hex head 98. Rod 96 is threaded along its shank that extends from head 98 and threads to a threaded through-hole in pushrod shaft 18 and to through-hole 76 in body 68 of slide 66.

Bridge 54 contains a narrow slot 99 that extends completely through pedal arm 20. At this location, shown in more detail in FIG. 3B, the thread of rod 96 has been removed to create a groove 101 around the outside of the rod's shank. A U-shaped clip 102 is inserted into slot 99 to place confronting portions of its parallel legs 103 in diametrically opposite portions of groove 101 as the legs straddle rod 96. Clip 102 has a circular cross section whose diameter is slightly less than the thickness of slot 99 as measured radial to axis 46. A cotter 104 placed on one of the legs opposite the 180° bend in clip 102 prevents the clip from coming out of slot 99.

This association of clip 102 with rod 96 and pedal arm 20 relates the rod and pedal arm so that radial movement of rod 96 toward and away from axis 46 causes the pedal arm to move with it, without impairing the ability of rod 96 to turn about its own axis.

With knobs 78, 80 loosened, the pedal ratio is selected by moving pedal mounting shaft 16 within slots 38, 40 while pushrod shaft 18 remains constrained by the passage of its end segments through slots 42, 44. The pedal shaft is moved by turning rod 96 via a tool (not shown) that is engaged with hex head 98. Because pushrod shaft 18 is constrained by slots 42, 44, rod 96 is threaded to the pushrod shaft, and clip 102 associates the rod and pedal arm 20 as has been explained, turning of rod 96 advances the rod toward axis 46, carrying pedal arm assembly 14 and pedal mounting shaft 16 upward with it relative to bracket 12.

As rod 96 is advancing upward, its threaded engagement with the slide 66 on pedal arm extension 22 is causing the latter to move downward on the upward moving pedal arm 20 with the net result that pedal pad 28 remains substantially at the same elevation off the vehicle floor.

Once a desired position for the pivot axis has been attained, knobs 78, 80 are tightened against the side wall of the bracket.

If rod 96 is being turned in the opposite sense with the knobs loosened, it moves downward on pushrod shaft 18 carrying pedal arm assembly 14 and shaft 16 with it. At the same time, the threaded engagement of rod 96 with slide 66 is causing pedal arm extension 22 to move upward on the downward moving pedal arm with the net result that the pedal pad remains substantially at the same elevation off the floor.

The method for setting the pedal ratio is convenient and can be quickly performed. The first step is loosening knobs 78, 80. Rod 96 is then turned. The use of a threaded rod allows the pedal ratio to be changed in small increments. Turning hex head 98 only a small amount can effect a very small change in the pedal ratio. Once a desired change has been made, the knobs are tightened, and the corresponding pedal ratio can be tested by depressing pedal pad 28.

While a presently preferred embodiment of the invention has been illustrated and described, it should be appreciated that principles of the invention apply to all embodiments falling within the scope of the following claims.

What is claimed is:

1. A foot pedal mechanism comprising:
   a bracket having a track;
   a first shaft associated with the bracket for positioning along the track in the bracket, the first shaft having a first axis;
   a mechanism for causing the first shaft to be held fast in a desired position along the track;
   a pedal arm supported on the first shaft for swinging about the first axis of the first shaft;
   a second shaft that has second axis parallel to the first axis of the first shaft and threaded through-hole;
   a positioning mechanism carried by the pedal arm for positioning the pedal arm and the first shaft along the track in the bracket to set a distance between the first axis of the first shaft and the second axis of the second shaft;

the second shaft being operatively related to the pedal arm for swinging with the pedal arm by a connection with the positioning mechanism;

a structure having an arcuate track operatively associated with the second shaft such that the structure provides guided constraint of the second shaft about the first axis of the first shaft when the second shaft is swinging with the pedal arm;

and a pedal arm extension that comprises a pedal pad and that is arranged for travel on the pedal arm radially of the first axis of the first shaft and has an operative connection with the positioning mechanism for causing the pedal arm extension to travel on the pedal arm radially relative to the first axis a distance equal to a change in distance between the first axis of the first shaft and the second axis of the second shaft as the first shaft is being positioned along the track in the bracket to cause distance between the pedal pad and the second shaft to remain substantially unchanged wherein the positioning mechanism comprises a rod, the rod having a third axis and a length extending radially with respect to the first axis of the first shaft, wherein the rod passes through, and has threaded engagement with the threaded through-hole in the second shaft, and wherein the pedal arm and the rod are operatively related for movement in unison to change distance between the first axis of the first shaft and the second axis of the second shaft when the rod turns about the third axis.

2. A foot pedal mechanism as set forth in claim 1 wherein the pedal arm comprises a tube through which the first shaft passes to support the pedal arm on the first shaft for swinging about the first axis of the first shaft, the bracket comprises sides containing aligned slots that define the track in the bracket, and the first shaft has end segments that pass through, and are constrained by, the aligned slots for travel along the aligned slots as the positioning mechanism operates to set distance between the first axis of the first shaft and the second axis of the second shaft.

3. A foot pedal mechanism as set forth in claim 2 wherein the mechanism comprises fasteners that are disposed on the end segments of the first shaft to allow the end segments to travel along the aligned slots when the fasteners are loosened and to hold the end segments fast against the sides when the fasteners are tightened.

4. A foot pedal mechanism as set forth in claim 3 wherein the structure comprises additional aligned slots in the sides.

5. A foot pedal mechanism as set forth in claim 1 further comprising:
a slot in the pedal arm;
a groove in the rod; and
a clip fitting in the slot and passing through the groove.

6. A foot pedal mechanism as set forth in claim 5 further comprising:
a threaded engagement between the rod and the pedal arm extension.

7. A brake pedal mechanism comprising:
a brake pedal mounting bracket having a track;
a vertical wall on which the brake pedal mounting bracket is mounted;
a brake pedal pivot shaft associated with the brake pedal mounting bracket for positioning along the track in the bracket, the brake pedal pivot shaft having a first axis;
a mechanism for causing the brake pedal pivot shaft to be held in a desired position along the track;
a pedal arm supported on the brake pedal pivot shaft for swinging about the first axis of the brake pedal pivot shaft; and a pushrod shaft that has second axis parallel to the first axis of the brake pedal pivot shaft and a threaded through-hole;

a positioning mechanism carried by the pedal arm for positioning the pedal arm and the brake pedal pivot shaft along the track in the bracket to set distance between the first axis of the brake pedal pivot shaft and the second axis of the pushrod shaft;

structure defining an arcuate track that provides guided constraint of the pushrod shaft about the first axis of the brake pedal pivot shaft when the pushrod shaft is swinging with the pedal arm; and a pedal arm extension that comprises a pedal pad and that is arranged for travel on the pedal arm radially of the first axis of the brake pedal pivot shaft and has an operative connection with the positioning mechanism for causing the pedal arm extension to travel on the pedal arm radially relative to the first axis of the brake pedal pivot shaft axis a distance equal to a change in distance between the first axis of the brake pedal pivot shaft and the second axis of the pushrod shaft as the brake pedal pivot shaft is being positioned along the track in the bracket to cause distance between the pedal pad and the pushrod shaft to remain substantially unchanged wherein the positioning mechanism comprises a rod having a length extending radially with respect to the first axis of the brake pedal pivot shaft and a third axis wherein the rod passes through, and has threaded engagement with the threaded through-hole in the pushrod shaft, and wherein the pedal arm and the rod are operatively related for movement in unison to change distance between the first axis of the brake pedal pivot shaft and the second axis of the pushrod shaft when the rod turns about the third axis.

8. A brake pedal mechanism as set forth in claim 7 wherein the pedal arm comprises a tube through which the brake pedal pivot shaft passes to support the pedal arm on the brake pedal pivot shaft for swinging about the first axis of the brake pedal pivot shaft, the bracket comprises sides containing aligned slots that define the track in the bracket, and end segments of the brake pedal pivot shaft pass through, and are constrained by, the aligned slots for travel along the aligned slots as the positioning mechanism operates to set distance between the first axis of the brake pedal pivot shaft and the second axis of the pushrod shaft.

9. A brake pedal mechanism as set forth in claim 8 wherein the mechanism comprises fasteners that are disposed on the end segments of the brake pedal pivot shaft to allow the end segments to travel along the aligned slots when the fasteners are loosened and to hold the end segments fast against bracket sides when the fasteners are tightened.

10. A brake pedal mechanism as set forth in claim 9 wherein the structure comprises additional aligned slots in the bracket sides.

11. A brake pedal mechanism as set forth in claim 7 further comprising:
a slot in the pedal arm;
a groove in the rod; and
a clip that fits in the slot in the pedal arm and passes through the groove in the rod without impairing the ability of the rod to turn.

12. A brake pedal mechanism as set forth in claim 11 further comprising:
a threaded engagement of the rod with the pedal arm extension.

* * * * *